(12) United States Patent
Chisholm (10) Patent No.: US 11,427,498 B2
(45) Date of Patent: Aug. 30, 2022

(54) THREE-DIMENSIONAL PRINTING OF A POROUS MATRIX ON A CONTAINER

(71) Applicant: Owens-Brockway Glass Container Inc., Perrysburg, OH (US)

(72) Inventor: Brian J. Chisholm, Sylvania, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 305 days.

(21) Appl. No.: 16/294,434

(22) Filed: Mar. 6, 2019

(65) Prior Publication Data

US 2020/0283332 A1 Sep. 10, 2020

(51) Int. Cl.
*B41M 5/00* (2006.01)
*B33Y 10/00* (2015.01)
(Continued)

(52) U.S. Cl.
CPC .......... *C03C 17/005* (2013.01); *B29C 64/112* (2017.08); *B33Y 10/00* (2014.12);
(Continued)

(58) Field of Classification Search
CPC ............ C03C 17/005; C03C 2218/119; C03C 2218/32; B41M 7/0045; B41M 5/0082; B41M 5/007; B41M 5/0088; B41M 7/0081; B29C 64/112; B29C 64/264; B65D 23/0807; B65D 23/085; B33Y 80/00; B33Y 10/00
See application file for complete search history.

(56) References Cited

U.S. PATENT DOCUMENTS

| 5,985,376 A | 11/1999 | Kamen |
| 6,283,022 B1 | 9/2001 | Kamen et al. |

(Continued)

FOREIGN PATENT DOCUMENTS

| EP | 0028171 A1 | 6/1984 |
| EP | 0307807 A1 | 7/1990 |

(Continued)

OTHER PUBLICATIONS

International Search Report and Written Opinion, Int. Serial No. PCT/US2020/020857, Int. Filing Date: Mar. 4, 2020, Applicant: Owens-Brockway Glass Container Inc., dated Sep. 8, 2020.

*Primary Examiner* — Yaovi M Ameh (57) ABSTRACT

This disclosure describes container(s) having an ultraviolet (UV)-cured matrix and methods to create the same. For example, a glass container according to this disclosure has a bottom and a body extending in a direction away from the bottom along a longitudinal axis. The body has a surface having an UV-cured matrix including UV-curable varnish drops arranged in a plurality of layers and having voids existing therebetween to form a porous matrix structure. One method to form the glass container is to apply a layer of UV-curable varnish to an outer surface of the glass container as a plurality of varnish drops, so as to establish a plurality of voids between the varnish drops, cure the layer of UV-curable varnish, apply one or more additional layers of UV-curable varnish, and cure the additional layer(s) of UV-curable varnish, wherein all of the varnish drops and the voids form the UV-cured matrix.

19 Claims, 5 Drawing Sheets

(51) Int. Cl.
*B33Y 80/00* (2015.01)
*B41M 7/00* (2006.01)
*C03C 17/00* (2006.01)
*B65D 23/08* (2006.01)
*B29C 64/112* (2017.01)
*B29C 64/264* (2017.01)

(52) U.S. Cl.
CPC ........... *B33Y 80/00* (2014.12); *B41M 5/0082* (2013.01); *B41M 7/0045* (2013.01); *B65D 23/085* (2013.01); *B65D 23/0807* (2013.01); *B29C 64/264* (2017.08); *B41M 5/007* (2013.01); *B41M 5/0088* (2013.01); *B41M 7/0081* (2013.01); *C03C 2218/119* (2013.01); *C03C 2218/32* (2013.01)

(56) References Cited

U.S. PATENT DOCUMENTS

| 8,784,932 | B2 | 7/2014 | Hill |
| 9,221,275 | B2 | 12/2015 | Till |
| 2004/0070223 | A1 | 4/2004 | Wong |
| 2009/0145511 | A1* | 6/2009 | Till ................ B41J 3/40733 141/2 |
| 2015/0050461 | A1 | 2/2015 | Yang et al. |
| 2016/0002104 | A1 | 1/2016 | Lehuede et al. |
| 2018/0056671 | A1* | 3/2018 | Boniface ............ B41J 2/2121 |

FOREIGN PATENT DOCUMENTS

| EP | 0307807 | B1 | 7/1990 |
| EP | 2168774 | A1 | 2/2011 |
| EP | 2168774 | B1 | 2/2011 |
| EP | 3424740 | A1 | 1/2019 |
| JP | 2004130779 | | 4/2004 |
| JP | 2011063465 | | 3/2011 |
| JP | 2013180482 | | 9/2013 |
| WO | 2017194656 | A1 | 11/2017 |

* cited by examiner

THREE-DIMENSIONAL PRINTING OF A POROUS MATRIX ON A CONTAINER

CROSS REFERENCE TO RELATED APPLICATIONS

This application relates to U.S. patent application Ser. No. 16/294,414 entitled "Three-Dimensional Printing on Glass Containers," filed Mar. 6, 2019, now issued as U.S. Pat. No. 10,752,538, and U.S. patent application Ser. No. 16/294,441 entitled "Repairing an Outer Surface of a Glass Product," filed Mar. 6, 2019, and published as U.S. Pub. No. 2020/0282654, both which are assigned to the assignee hereof and incorporated herein by reference in their entirety.

TECHNICAL FIELD

This patent application discloses device(s) and methods to print three-dimensional (3D) features. More particularly, this application discloses articles in which the ink-receptive surface for 3D printing includes glass.

BACKGROUND

Glass manufacturing is a process to produce glass objects, including glass containers, formed from a wide variety of glass compositions. Glass objects are formed from molten glass that is injected, pressed or blown into a mold, but it is difficult to create sharp, distinct angles, features or undercuts by molding due to the tendency of molten glass to flow and level after removal of the object from the mold, especially in high capacity manufacturing systems in which the object is removed prior to the glass fully hardening. Also, certain features such as undercuts cannot be molded into the glass object, as such undercut would prevent removal of the mold, as it would be mechanically locked onto the glass object. Also, it is desirable to add flexibility in the manufacture of glass objects to utilize a single mold to produce a glass object without certain features, so that such features can be added to that glass object after removal from the mold, avoiding the cost of having separate molds for each separate type of feature desired. Once formed, the objects may undergo secondary processing to create various additional decorative and/or functional features on the glass surface, Depending on the complexity of the features and the processing conditions required, these molds can be difficult and/or costly to produce, which can limit the shapes and geometries of the final glass product.

Additionally, secondary processing can involve pairing the formed glass object with various secondary components to create the decorative and/or functional features. Often, the secondary components require an additional packaging step or a separable piece that increases the complexity of forming the final glass product.

BRIEF SUMMARY OF THE DISCLOSURE

The present disclosure embodies a number of aspects that can be implemented separately from or in combination with each other.

In accordance with one aspect of the disclosure, there is provided a glass container having a bottom and a body extending in a direction away from the bottom and along a longitudinal axis. The body has a surface including a ultraviolet (UV)-cured matrix. The UV-cured matrix includes UV-curable varnish drops arranged in a plurality of layers and voids existing therebetween to form a porous matrix and/or a closed-cell structure. The term varnish as used herein may include a varnish with or without colored ink added to such varnish.

In accordance with another aspect of the disclosure, there is provided a method of applying UV-curable varnish to a glass container. The method includes (a) applying a layer of UV-curable varnish to an outer surface of the glass container as a plurality of varnish drops, so as to establish a plurality of voids between the varnish drops; (b) curing the layer of UV-curable varnish using UV light to fix the voids between the varnish drops; (c) applying one or more additional layers of UV-curable varnish as a plurality of additional varnish drops to the cured layer of varnish, so as to establish a plurality of additional voids between the additional varnish drops; and (d) curing the additional layer(s) of UV-curable varnish using UV light to fix the additional voids between the additional varnish drops. All of the varnish drops and the voids form the UV-cured matrix having the porous matrix and/or closed-cell structure.

In accordance with another aspect of the disclosure, there is provided a method of printing a UV-cured matrix on a glass container. The method includes (a) identifying a plurality of locations on a body of the container where the UV-cured matrix will be formed; (b) determining a height value of the UV-cured matrix at each location; (c) assigning a grayscale value to each location based on the height value; (d) applying at least one varnish layer to the body according to the assigned grayscale value at each location, where the at least one varnish layer is curable in response to ultraviolet (UV) light; and (e) applying UV light to cure each respective varnish layer, wherein steps (d) to (e) are repeated until the at least one varnish layer reaches the respective height value at each location.

BRIEF DESCRIPTION OF THE DRAWINGS

The disclosure, together with additional objects, features, advantages and aspects thereof, will be best understood from the following description, the appended claims, and the accompanying drawings, in which:

DETAILED DESCRIPTION

Due to the delicate nature of glass containers, they are often sensitive to scratches, cracks, bubbles, and other similar commercial variations formed during the manufacturing process. After formation, glass containers undergo inspection to select out any containers that possess such a commercial variation. During their use, containers (e.g., glass containers) are often used to store sensitive contents, such as beverages that are intended to be consumed cold. In many cases, secondary elements, such as insulated sleeves or refrigeration units, are needed to keep the containers cold. These secondary elements are added after the manufacturing and inspection process, and prior to their use. However, 3D objects can be created that insulate the container and otherwise keep its contents at a desired temperature without the need for removable secondary elements or components. Various decorative images and textural features may also be printed on the surface.

Additive manufacturing and 3D printing are methods to form additional features on a container after manufacturing using, for example, a digital inkjet printer, a printer extruder, an additive manufacturing machine, or the like. Additive manufacturing can include using a digital model of a desired object to be printed that is generated using known software, for example, standard desktop software or ProEngineer. This digital model can be "sliced" or subdivided into thin layers, each of which is subsequently printed and/or faulted to create a 3D object. Because the digital model can have any size, shape, or feature desired, the corresponding 3D object created can be equally diverse in terms of its size, shape, features, and the like. It is possible to create three dimensional structures having geometries that are not feasible and/or otherwise possible through other types of manufacturing, including molding or welding various parts together. The final geometry created can be a single monolithic structure that does not include any welds, seams, or other joined areas between parts. It will be appreciated that the final geometry can include various parts that are not additively manufactured and/or are not part of the single monolithic structure. These parts can be formed using traditional manufacturing techniques, such as cutting and/or welding, while other parts are additively manufactured using the material build up process.

While the above 3D model can be utilized in additive manufacturing of the corresponding 3D object, 2D grayscale values associated with the 3D object can also be used with 3D printing to print and form the 3D object. The 2D grayscale values can be used to control the amount of ink, and thus, the height of material printed at a specific location when forming the 3D object. For example, while inkjet printers can apply different shades and/or colors of ink based on darkness and/or color needed in a particular area, it is also possible to apply more ink (i.e., to form a greater height or thickness) in specific locations of the final product that are associated with a darker or higher grayscale value and less ink to specific locations of the final product that are associated with a lighter or lower grayscale value. As a result, the printer can print more layers of ink (e.g., ink buildup) and/or larger ink droplets onto the surface of a substrate or container that is associated with a darker grayscale value. The ink droplets can also have different shapes, sizes, spatial densities, and the like with respect to each other and/or in different areas of the surface to which they are applied. Utilizing additive manufacturing and/or 3D printing of features onto glass containers can facilitate light-weighting (e.g., less material is used for portions of the containers), which can support sustainability initiatives and improve line performance speed.

The ink used in the printing process can possess a wide variety of compositions and components. For example, the ink can include a varnish that is ultra-violet (UV) light curable so that the application of UV light cures or solidifies the ink in place on the container. The ink can include various monomers, polymers, pigments, colors (e.g., CMYK process colors), additives, finishes, and the like to style and/or protect the container. If desired, the ink can also closely resemble glass, having a similar feel and being similarly transparent to visible light. The ink can also be translucent, for example, with only the varnish applied. Of course, the ink can also appear very different from glass to create a contrast between the container and the ink by adding pigments to create a translucent or opaque feature. Further, the ink can include organic and/or inorganic components.

In addition to setting the grayscale value of the printing process and/or the type of ink, various other printing parameters can be selected before applying the ink. For example, a method of printing can include setting the position of the substrate or container with respect to the printer, setting the printing speed, and/or setting various parameters of ink curing. For example, the method can include setting the curing time for the ink (e.g., setting of a UV curing time between each layer of material to obtain a suitable translucent effect), setting the curing intensity (e.g., UV intensity), setting the number of revolutions of curing in the curing process, and/or setting the rotation speed.

The ink may be deposited in various layers, and each layer can be composed of different compositions and components and each layer may be cured after being applied. Because various objects can be formed on the glass container surface, and the ink used to create the objects can have a wide variety of chemical compositions, this method imparts great flexibility and ease to the secondary processing of containers. Additionally, because this process can be performed after manufacturing and inspection, it can increase the efficiency (or at least not further decrease the efficiency) of the useable containers produced.

In some cases, the larger ink droplets can be a combination of smaller ink droplets. In this example, the printer emits ink droplets as dictated by the grayscale value assigned. As the ink droplets are dispensed by the printer, the smaller ink droplets combine in the air on the way to the print surface to form larger droplets. The printer can emit a series of small ink droplets that combine to form a larger droplet, which is different than smaller dots building on the surface to make larger dots. In the grayscale concept, if more ink is needed, the software will determine when to combine dots to move from one gray level to the next. Likewise, the objects printed do not necessarily form a double-sided image such that one view or image is visible from one side of the container and another, different view or image is visible from another side of the container.

Figure 1:
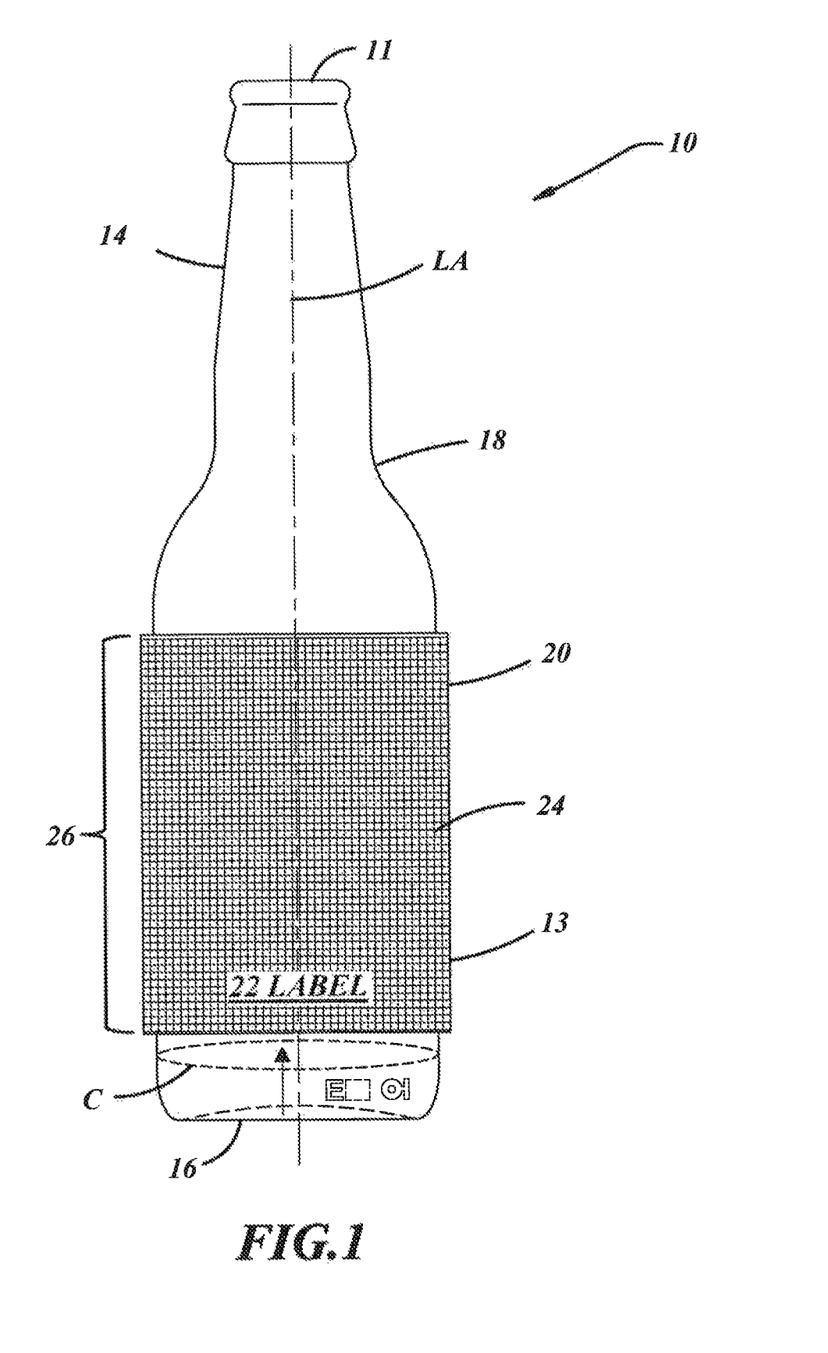
FIG. 1 depicts a container having the UV-cured matrix thereon.

To further illustrate this concept, FIG. 1 depicts a glass container 10 having a bottom 16 and a body 14 extending in a direction away from the bottom 16. One exemplary direction is depicted with the lower arrow aligned with a longitudinal axis LA in FIG. 1. The body 14 extends along the longitudinal axis LA to a mouth 11, which may be used to dispense the product or contents of the glass container 10. While the container 10 shown in FIG. 1 is similar to a traditional beer or soda bottle, it will be appreciated that the container 10 could have any shape or size desired. It will be appreciated that the container 10 could also be a glass substrate, such as a solid glass with a flat or planar surface. The body 14 includes the glass substrate 18 formed during manufacturing and an ultraviolet (UV)-cured matrix 20 carried thereon that includes and/or is formed from UV-curable varnish drops. The UV-curable varnish drops are formed from ink printed on the glass container 10 with a printer, such as a digital inkjet printer. The ink is deposited on the glass container as varnish drops that are arranged in a plurality of layers, where each respective layer can be UV-cured after being formed and prior to printing and/or forming each next layer. Voids exist between the varnish drops so that the varnish drops and voids form a porous matrix and/or a closed-cell structure 24.

The term closed cell structure may be interchangeably used with the terms a porous and/or low-density structure (e.g., foam), a porous matrix, and/or a thermal matrix to describe a structure in which a network of boundaries or walls have a generally curvilinear form and create cells having central voids. The network of boundaries or walls are connected with each other, and the overall porous matrix and/or closed-cell structure is mostly the voids (e.g., sometimes greater than 95%), but in some instances, may include some open cells. In particular, varnish drops in a single layer may not touch or be directly connected to each other. However, varnish drops of one layer may touch or be directly connected to varnish drops of an adjacent layer. In this way, each layer contains varnish drops that may be offset from the adjacent layer. In other words, the varnish drops of one layer are out-of-line with the varnish drops of the subsequent, later-applied layer in order to form the porous matrix and/or closed-cell network of trapped air. This offset geometry will be discussed in further detail in FIG. 2C.

The voids provide space to trap air within the closed-cell structure. This trapped air provides the insulating properties to the container, and allows the container to remain at a desired temperature longer, regardless of the exterior environment surrounding the container. In a closed-cell structure, the voids are mostly closed (e.g., closed cells) so that these voids are completely surrounded by bounding walls, although some cells may be open to each other or to the glass container environment. No fluid can enter or leave these cells once they are established without fracturing a portion of the closed-cell structure. In some cases, while most of the cells may be closed cells, the closed-cell structure may include open cells.

As depicted in FIG. 1, the closed-cell structure 24 of the UV-cured matrix 20 forms a tubular body or structure 26 about the longitudinal axis LA of the glass container 10. In implementations, the closed-cell structure 24 may be formed on a cylindrical glass container 10 and/or on a non-round or non-tubular container 10. In other implementations, the closed-cell structure 24 may be discontinuous about the longitudinal axis LA of the glass container. By 3D printing the UV-cured matrix 20 onto the glass container 10, the body 14 is integrally formed with the UV-cured matrix 20 so that the UV-cured matrix 20 is immobilized onto the glass container 10. Once formed, the UV-cured matrix 20 is inseparable from the body 14 during customary use of the glass container 10 (e.g., food storage and consumption).

It will be appreciated that the UV-cured matrix 20 could also be formed on any exterior surface of the container. Additionally, the UV-cured matrix 20 could be formed on an entire surface of the container, or just a portion of the surface. The varnish drops could be applied about or around the entire circumference C, or the container 10 could have portions about or around the circumference C that are free of varnish drops. Moreover, the UV-cured matrix 20 may be formed as a feature other than a tubular body. For example, some features may include threads, lugs, 3-D bumpers at the shoulder and/or base of the body, and/or a coating.

Additionally, even though this disclosure discusses some advantages of 3D printing on glass containers, the features discussed herein could apply to any type of container having any type of material. Because the 3D features added to the container are printed with an inkjet printer, there is no need for a mold to form the 3D feature on the container. The printer prints the ink in the desired location without the use of a mold or similar forming device. This has the advantage of increasing the shapes and geometries possible on the container. Further, 3D printing can eliminate the need to combine the formed container with a secondary component because a similar feature can be printed on the container's surface. This has the advantage of simplifying the manufacturing process (e.g., reducing the number of steps) and/or the number of separable pieces used to create the final container product, and the number and types of molds to be purchased.

The printer can deposit a first layer of ink onto the glass container 10 as a plurality of varnish drops. Additional layers of varnish drops can be subsequently added to the first layer. In some cases, each layer of varnish drops is cured separately and immediately after it is added to form a solid layer before adding or printing additional layers.

The type of printer used can be any type generally known in the art (e.g., an inkjet, a UV cure printer, and the like). For example, the printer can have a variety of print heads to emit the ink, and a variety of storage reservoirs for the ink. Additionally, the printer may have a chamber containing a container support medium or container transfer mechanism and an open space for housing the container during printing. The printer will either have or be connectable to a UV light source for curing the ink after its application. The printer is selectively coupled to a computer or processor that runs the corresponding software to direct printing of the desired 3D feature. The processor can be any type of device capable of processing electronic instructions including microprocessors, microcontrollers, host processors, controllers, and application specific integrated circuits (ASICs).

It will be appreciated that the printer prints ink on the surface of the container in order to form the UV-cured, porous matrix. The container itself does not have a UV-cured, porous structure until after 3D printing occurs. Thus, the body without the UV-cured matrix is an intermediate structure. After printing, the body includes the matrix carried thereon. As pores or cells are established on the surface, they are cured or pinned in place so that subsequent varnish drops do not, or only minimally (less than about 5%), penetrate into the established pores or cells. Instead, subsequent varnish drops establish further pores or cells in the UV-cured matrix.

After the UV-cured matrix 20 is formed on the glass container 10, a label 22 can be added to all or only a portion of the UV-cured matrix 20. While the UV-cured matrix 20 is generally not separable from the body 14, the label 22 may be separable such that the label 22 is adhered to the UV-cured matrix 20 by any method known in the art, including gluing, tacking, shrinking, sticking, fastening, and the like. In one example, the glass container 10 does not include any label 22 around its exterior surface 18. It will be appreciated that, in some prior technology, a label could be used to create the voids or trapped air that assists in insulating the container. However, the UV-cured matrix discussed herein does not require the use of a label in order to establish the insulating voids because they are established between the varnish drops regardless of the application of any label.

Optionally, after forming the UV-cured matrix 20, a sealing layer 13 can be added to the glass container 10, being the outermost layer of the glass container 10. The sealing layer 13 can include or be formed of the UV-curable varnish used to print the UV-cured matrix 20, and it can be contiguous or continuous about or around the entire exterior surface 18. Alternatively, the sealing layer 13 can also extend only around a portion of the exterior surface 18. The sealing layer 13 can further protect the UV-cured matrix 20 from scratches, cracks, handling, and other supply chain abrasion or damage, especially if the UV-cured matrix 20 also includes a decorative image. In some instances, an image can be printed and/or formed on the sealing layer 13.

Figure 2A:
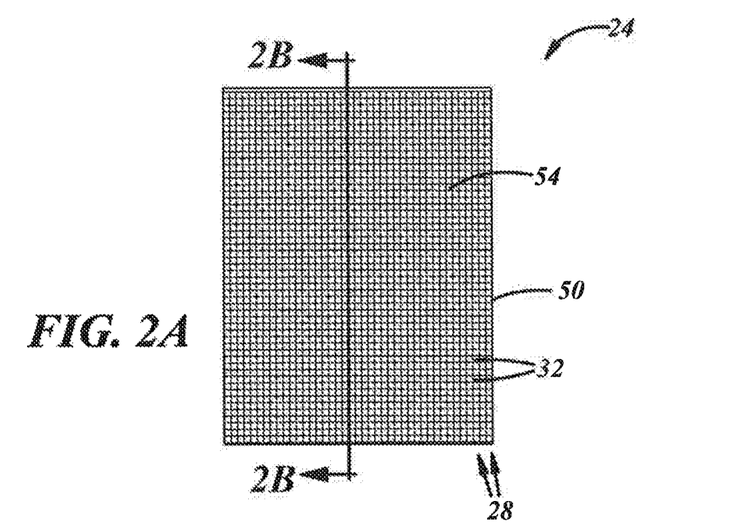
FIGS. 2A-C depict the UV-cured matrix having a repeating pattern.
Figure 2B:
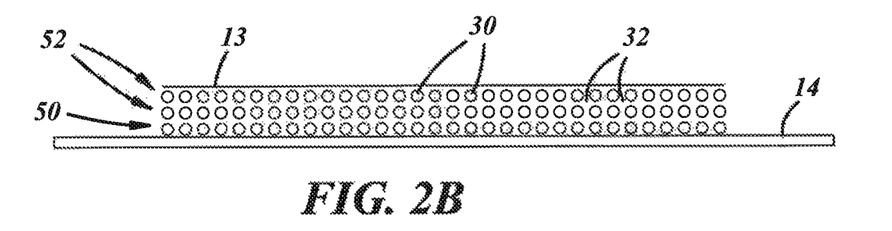
Figure 2C:
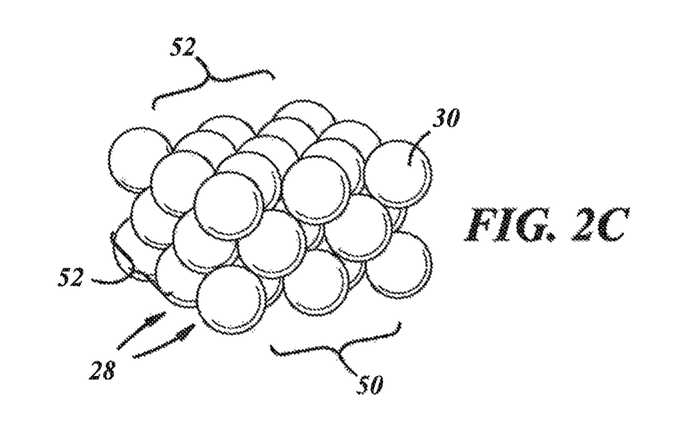

FIGS. 2A-C depict the closed-cell structure 24 being arranged in a repeating pattern 54. In the repeating pattern 54, the varnish drops 30 are printed on the glass container in a plurality of layers (e.g., first layer 50). The first layer 50 includes the varnish drops 30 arranged in a plurality of rows (e.g., rows 28). As discussed above, the varnish drops 30 are arranged to have voids 32 existing therebetween.

As shown in FIG. 2B, after the first layer 50 is formed or printed, subsequent or additional layers (e.g., layer 52) can be formed or printed on top of first layer 50, each of these additional layers 52 having the same repeating pattern 54 as the first layer 50. Sealing layer 13 can form the outermost layer of the body 14. FIG. 2B depicts the repeating pattern 54 being a square pattern, in which each of the varnish drops is arranged at the bounding corner of a square. Alternatively, the repeating pattern 54 could be any type of repeating pattern, including circular, triangular, square, diamond-shaped, or hexagonal.

FIG. 2C shows a perspective view of the closed-cell structure 24. As can be seen in this view, varnish drops 30 are arranged in layers (50, 52) and rows 28. In this example, varnish drops 30 in the first layer 50 do not connect to each other and have voids therebetween. However, varnish drops 30 in subsequent adjacent layers (50, 52) are offset from the drops in the layer below so that the drops in subsequent adjacent layers connect to drops in the rows 28 of underlying adjacent layers. In this offset arrangement, each subsequent layer has a profile shift from the adjacent layer below. While this offset arrangement is depicted for a square, similar to the repeating pattern of a body-centered cubic crystal structure, it could also be formed with a different type of repeating pattern or a random pattern to create voids.

Figure 3A:
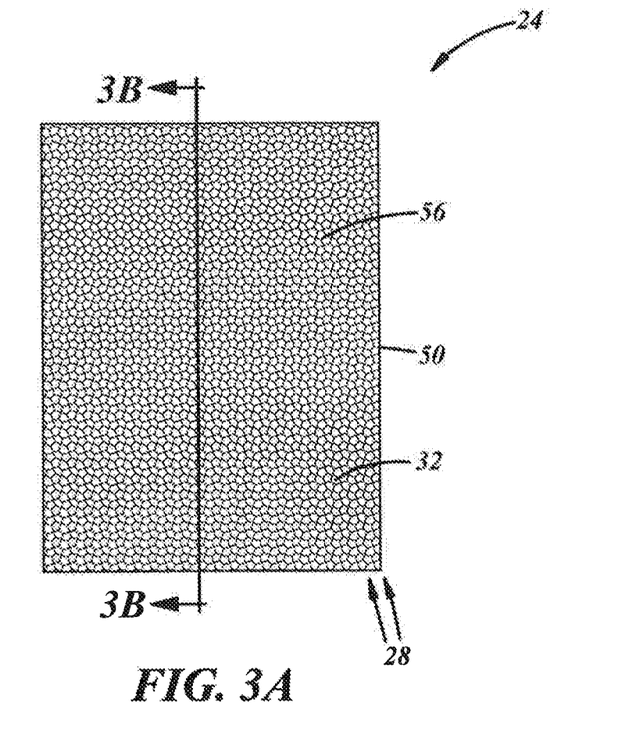
FIGS. 3A-B depict the UV-cured matrix having a random pattern.
Figure 3B:
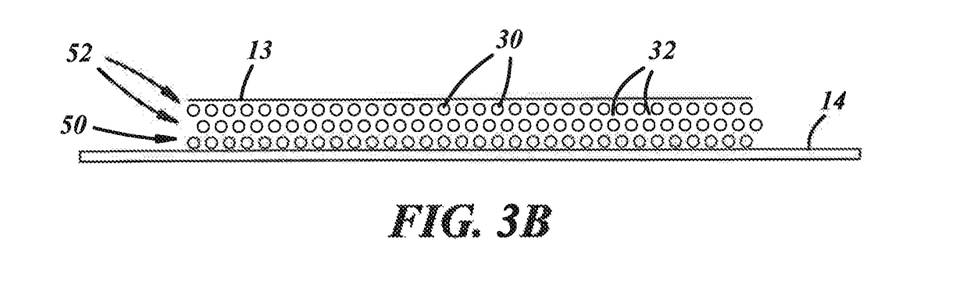

FIGS. 3A-B depict varnish drops 30 arranged in a random pattern 56. In this case, the first layer 50 is formed of varnish drops 30 arranged randomly with respect to each other. In this arrangement, the varnish drops 30 can still be printed in rows (e.g., rows 28); however, rows 28 will include a varying and random number of varnish drops. As depicted in FIG. 3B, while voids 32 still exist between the varnish drops 30, the voids 32 will have varying size, shape and spacing (e.g., density) with respect to each other. It will be appreciated that the overall UV-cured matrix can include layers of varnish drops 30 that are all in a repeating pattern, all in a random pattern, or in some combination of repeating and random patterns between the layers (e.g., layers 50, 52).

It will be appreciated that the UV-cured matrix having the closed-cell structure is not a single layer or row of varnish drops having gaps therebetween. Instead, the closed-cell structure is a complex, 3D arrangement of varnish drops and voids, existing in a plurality of layers and rows, as depicted in FIGS. 2A-3B. As discussed above, some of the cells in the structure may be closed from adjacent cells.

Figure 4A:
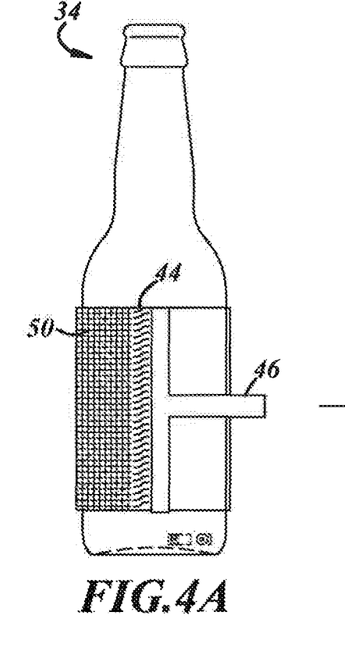
FIGS. 4A-E depicts steps of a method of printing the UV-cured matrix on a container
Figure 4B:
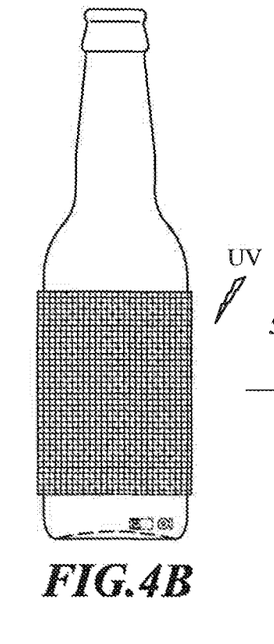
Figure 4C:
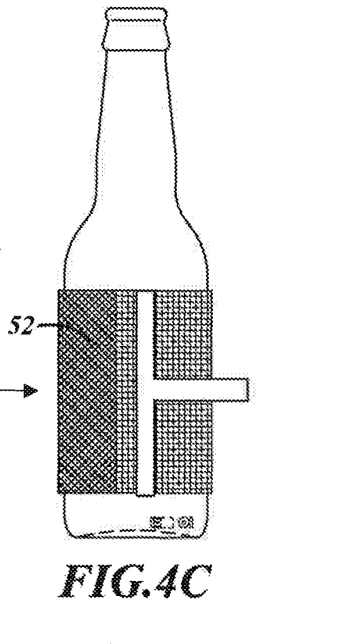

FIGS. 4A-D depict steps of one method 34 of forming the UV-cured matrix and applying the UV-curable varnish to the glass container. In FIG. 4A, the print head 46 can apply ink 44 to the glass bottle in a first layer 50, forming a repeating pattern. This step includes applying a layer of UV-curable varnish to an outer surface of the glass container as a plurality of varnish drops, so as to establish a plurality of voids between the varnish drops. Subsequently in FIG. 4B, the method 34 includes curing the layer of UV-curable varnish using UV light to fix the voids between the varnish drops. In some instances, the varnish/ink may be cured just after it is ejected from the print head. In step 4C, the method 34 includes applying one or more additional layers (e.g., layer 52) of UV-curable varnish as a plurality of additional varnish drops to the cured layer of varnish, so as to establish a plurality of additional voids between the additional varnish drops.

Figure 4D:
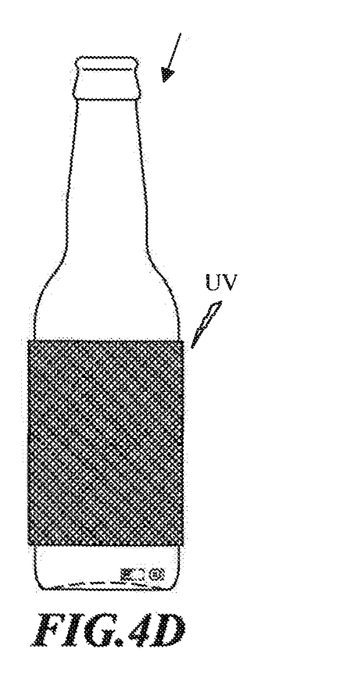
Figure 4E:
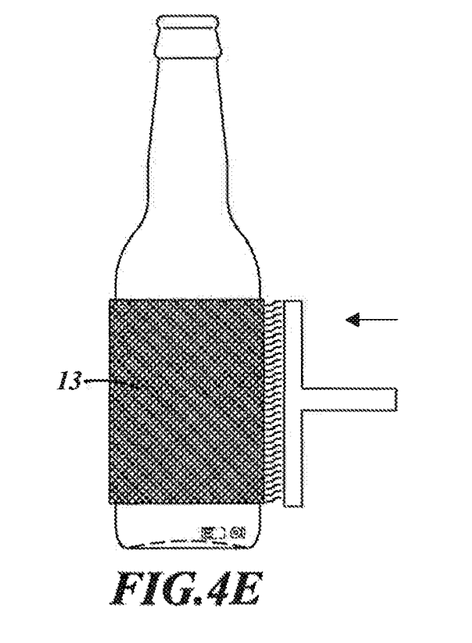

In FIG. 4D, the additional layer 52 is also cured with UV light to fix the additional voids between the additional varnish drops. No matter how many layers of ink 44 are applied, all of the varnish drops and the voids form a UV-cured matrix having a closed-cell structure. In FIG. 4E, the method 34 optionally includes using the print head 46 to apply a sealing layer 13 about the UV-cured matrix. The sealing layer 13 can be contiguous about the entire UV-cured matrix and/or the entire exterior surface. Also, optionally, the method 34 can include printing an image on the UV-cured matrix, instead of or in addition to the sealing layer 13. Also, optionally, the method 34 can include applying a label positioned about at least a portion of the UV-cured matrix, instead of or in addition to the sealing layer 13 and/or an image. In some examples, no label is applied to any portion of the glass container, as a label is an optional component.

Figure 5A:
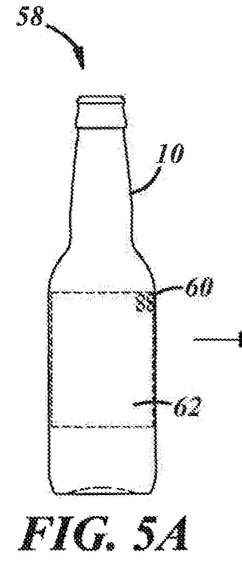
FIGS. 5A-F depict steps of a method of printing a UV-cured matrix on the container.
Figure 5B:
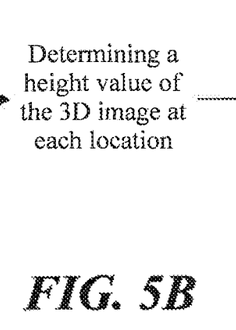
Figure 5C:
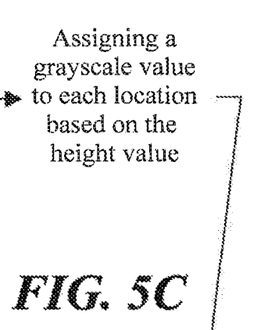

FIGS. 5A-F depict various steps of a method 58 of printing a UV-cured matrix 20 on the container 10. In FIG. 5A, the method includes identifying a plurality of locations (e.g., locations 60) on the container surface where the UV-cured matrix 20 will be formed. These locations 60 are located within the boundary 62. Even though only four locations are illustrated in FIG. 5A, the boundary 62 may be covered or partially covered with the locations 60. Once the locations 60 for the UV-cured matrix 20 are selected, the method 58 includes determining a height value of the UV-cured matrix 20 at each location 60. Each location 60 may have a different height value associated with it, depending on how high or tall the UV-cured matrix 20 is determined to be on the container 10 at that respective location 60. This is depicted in FIG. 5B. In FIG. 5C, the method 58 includes, next, assigning a grayscale or numeric value to each location 60 based on the height value. The height at each respective location 60 will be formed by the amount of varnish drops 30 (e.g., the number of layers and/or size of varnish drops 30) deposited by the printer at that location. A higher feature means that more varnish is deposited at that location 60.

At some point in the method before printing, the method may also include flame treating the container 10. Flame treating the container 10 can alter the surface or location 60 where the ink and/or primer will ultimately be applied by increasing its surface energy and/or creating polar sites in order to form a stronger bond between the surface or location 60 and the ink or a primer. Additionally, silanization may be used, in which the container 10 is exposed to a silicon-containing compound to form organofunctional alkoxysilane molecules on the container 10 that form a strong bond with the ink or primer. For example, silane (e.g., Pyrosil) can be applied with propane or natural gas as an additive to a gas mixture. The gas mixture can be applied to the glass surface of the container 10 when the glass is at ambient temperature. The glass can reach about 60° C. to 80° C. (e.g., 70° C.) during flaming.

Additionally, before printing the ink, the method may include application of a primer (e.g., Marabu Brue Primer) onto the container's surface or location 60. Similar to the flame treatment described above, the primer can assist in or strengthen bonding the ink to the container 10.

Figure 5D:
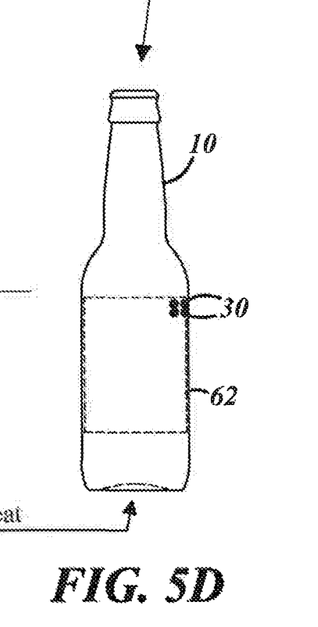
Figure 5E:
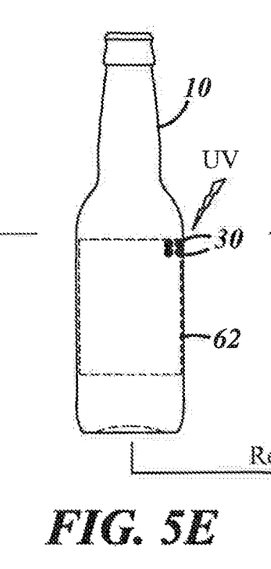
Figure 5F:
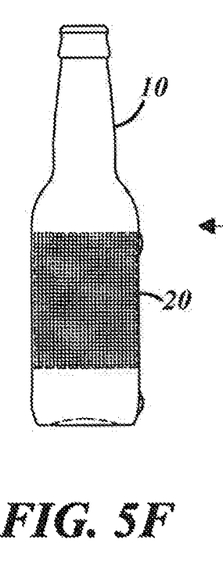

Shown in FIG. 5E, the varnish drops 30 are cured with UV light. As each layer of varnish is applied, UV light can cure and/or solidify each layer immediately after its application and/or just after the varnish/ink is ejected from the print head, which may serve to obtain a translucent effect. In an example, a UV curing timer can be used to control a UV light between each layer application. The method 58 may include repeating the steps depicted in FIGS. 5D-E until the varnish drops 30 reach the respective height value assigned in each location 60. As shown in FIG. 5F, the method 58 results in a container 10 having a UV-cured matrix 20 disposed on the body 14.

For example, a method of the present disclosure includes (a) identifying a plurality of locations on a body of the container where the UV-cured matrix will be formed; (b) determining a height value of the UV-cured matrix at each location; (c) assigning a grayscale or numeric value to each location based on the height value; (d) applying at least one varnish layer to the body according to the assigned grayscale or numeric value at each location, where the at least one varnish layer is curable in response to ultraviolet (UV) light; and (e) applying UV light to cure each respective varnish layer, wherein steps (d) to (e) are repeated until the at least one varnish layer reaches the respective height value at each location. This method can include applying the varnish in a plurality of layers and curing each layer immediately after it is applied until the UV-cured matrix is formed. It will be appreciated that any number of varnish layers can be deposited until the respective height value is achieved.

There thus has been disclosed device(s) with and methods to print three-dimensional (3D) features. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of applying UV-curable varnish to insulate a glass container, comprising the steps of:
   (a) applying a layer of UV-curable varnish to, and around a circumference of, an outer surface of the glass container as a plurality of varnish drops, so as to establish a plurality of voids between the varnish drops;
   (b) curing the layer of UV-curable varnish using UV light to fix the voids between the varnish drops;
   (c) applying one or more additional layers of UV-curable varnish as a plurality of additional varnish drops to the cured layer of varnish, and around the circumference of the container, so as to establish a plurality of additional voids between the additional varnish drops;
   (d) curing the additional layer(s) of UV-curable varnish using UV light to fix the additional voids between the additional varnish drops, wherein all of the varnish drops and the voids extend entirely around the circumference of the container to form a tubular UV-cured matrix having a porous matrix structure to insulate the glass container, and
   (e) applying a sealing layer continuous around the tubular UV-cured matrix to form an outermost layer of the glass container.

2. The method of claim 1, wherein curing the additional layer(s) includes UV-curing each respective layer with ultraviolet light after being formed.

3. The method of claim 1, wherein the sealing layer comprises UV-curable varnish.

4. The method of claim 1, further comprising step (f) printing an image on at least one of the UV-cured matrix or the sealing layer.

5. The method of claim 1, wherein the layers of UV-curable varnish are offset from each other so that the varnish drops in the layer connect to the varnish drops in the additional layer.

6. The method of claim 1, wherein all of the varnish drops are arranged in rows and in a repeating or random pattern to form the porous matrix structure.

7. The method of claim 6, wherein the repeating pattern is a pattern selected from the group consisting of circular, square, diamond-shaped, and hexagonal.

8. The method of claim 1, wherein the method does not include applying a label.

9. The method of claim 1, further comprising step (f) applying a label positioned about at least a portion of the UV-cured matrix.

10. A method of applying UV-curable varnish to a glass container to insulate the glass container, comprising the steps of:
    (a) applying a layer of UV-curable varnish to an outer surface of the glass container as a plurality of varnish drops, so as to establish a plurality of voids between the varnish drops;
    (b) curing the layer of UV-curable varnish using UV light to fix the voids between the varnish drops;
    (c) applying one or more additional layers of UV-curable varnish as a plurality of additional varnish drops to the cured layer of varnish, so as to establish a plurality of additional voids between the additional varnish drops; and
    (d) curing the additional layer(s) of UV-curable varnish using UV light to fix the additional voids between the additional varnish drops,
    wherein the first and second pluralities of varnish drops and voids form a UV-cured matrix having a closed-cell structure of trapped air that provides insulating properties to the container.

11. The method of claim 10, wherein curing the additional layer(s) includes UV-curing each respective layer with ultraviolet light after being formed.

12. The method of claim 10, wherein the first and second pluralities of varnish drops and voids extend entirely around a circumference of the glass container to form the UV-cured matrix as a tubular structure.

13. The method of claim 12, further comprising step (e) applying a sealing layer about the UV-cured matrix, the sealing layer being continuous around an entire circumference of the glass container.

14. The method of claim 13, wherein the sealing layer comprises UV-curable varnish.

15. The method of claim 10, further comprising step (e) printing an image on at least one of the UV-cured matrix or a sealing layer.

16. The method of claim 10, wherein the layers of UV-curable varnish are offset from each other so that the varnish drops in the layer connect to the varnish drops in the additional layer.

17. The method of claim 10, wherein all of the varnish drops are arranged in rows and in a repeating or random pattern to form the porous matrix structure.

18. The method of claim 17, wherein the repeating pattern is a pattern selected from the group consisting of circular, square, diamond-shaped, and hexagonal.

19. The method of claim 10, wherein the method does not include applying a label.

* * * * *